US008951923B2

(12) United States Patent
Liguore

(10) Patent No.: US 8,951,923 B2
(45) Date of Patent: Feb. 10, 2015

(54) HYBRID COMPOSITE STRUCTURE HAVING DAMPED METALLIC FIBERS

(75) Inventor: Salvatore L. Liguore, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 2260 days.

(21) Appl. No.: 11/752,467

(22) Filed: May 23, 2007

(65) Prior Publication Data

US 2010/0133039 A1    Jun. 3, 2010

(51) Int. Cl.
| | |
|---|---|
| B29C 70/00 | (2006.01) |
| B32B 25/10 | (2006.01) |
| B32B 5/26 | (2006.01) |
| B32B 5/28 | (2006.01) |
| B64C 1/00 | (2006.01) |

(52) U.S. Cl.
CPC .............. B32B 25/10 (2013.01); B29C 70/00 (2013.01); B32B 5/26 (2013.01); B32B 5/28 (2013.01); B64C 2001/0072 (2013.01); Y02T 50/433 (2013.01); Y02T 50/43 (2013.01)
USPC .......................................................... 442/31

(58) Field of Classification Search
USPC ............ 442/6, 31, 52; 428/608, 292.1, 293.7, 428/297.4, 299.1, 301.1, 301.4
See application file for complete search history.

(56) References Cited

U.S. PATENT DOCUMENTS

| | | | |
|---|---|---|---|
| 4,433,582 A | * | 2/1984 | Joosten .......................... 73/788 |
| 6,764,754 B1 | * | 7/2004 | Hunter et al. .............. 428/301.4 |
| 6,796,408 B2 | | 9/2004 | Sherwin et al. |
| 2004/0051219 A1 | | 3/2004 | Sherwin et al. |
| 2007/0071957 A1 | * | 3/2007 | Atkins et al. ............... 428/292.1 |
| 2008/0277057 A1 | * | 11/2008 | Montgomery et al. .... 156/307.1 |

FOREIGN PATENT DOCUMENTS

| | | |
|---|---|---|
| WO | PCT/US 2008/064145 | 5/2008 |
| WO | 2008147754 A1 | 12/2008 |

OTHER PUBLICATIONS

International Search Report dated Sep. 1, 2008 regarding Application No. PCT/US2008/064145 (WO2008147754), 2 pages.
San Juan et al., "Damping behavior during martensitic transformation in shape memory alloys," Journal of Alloys and Compounds, vol. 355, pp. 65-71, Jun. 2003.

* cited by examiner

*Primary Examiner* — Arti Singh-Pandey
(74) *Attorney, Agent, or Firm* — Yee & Associates, P.C.

(57) ABSTRACT

A damped composite structure is formed from a matrix material and a plurality of shape memory alloy wire fibers held in the material matrix for damping the structure. The wire fibers may be embedded in a viscoelastic interlayer to increase damping of the structure. The wire fibers may be interspersed with reinforcement such as carbon fibers, in tows or in a mesh of fibers. The wire fibers have an inherent material loss factor greater than approximately 0.10, and may be formed from superelastic metal alloys, such as Ni—Ti, Cu—Zn—Al, Cu—Al—Ni, OR Cu—Al—Be.

20 Claims, 4 Drawing Sheets

HYBRID COMPOSITE STRUCTURE HAVING DAMPED METALLIC FIBERS

TECHNICAL FIELD

This disclosure generally relates to composite material structures, especially those used in aerospace applications, and deals more particularly with a composite structure having embedded metallic fibers for damping sound and vibration.

BACKGROUND

Noise and low frequency vibration may be created in commercial aircraft by a variety of sources. For example, exterior noise may be created by air passing over the aircraft's outer skin in a turbulent boundary layer. Also, wing mounted engines may excite low frequency vibration modes of the aircraft's fuselage. This vibration energy may be transmitted through the fuselage by stringers and frames and enter into the cabin interior as noise.

One solution for reducing noise and vibration involves the use of damping treatments such as "add-on" patches of viscoelastic materials which absorb and dampen noise and vibration. These add-on patches are essentially "peel and stick" components that are added to various parts of the aircraft, such as skins, frames and floor panels. A typical commercial aircraft may employ as many as 2500 to 3500 of these patches. While effective in reducing noise and vibration, the patches add weight to the aircraft and are labor intensive to install.

Accordingly, there is a need for a composite structure having inherent damping qualities that reduce or eliminate the need for add-on damping treatments of the type mentioned above. Embodiments of the disclosure are intended to satisfy this need.

SUMMARY

The disclosed embodiments provide a composite structure possessing inherent sound damping that reduces sound and vibration before they are transmitted to the interior of the cabin. The composite structure relies on the use of embedded metallic fibers formed of super-elastic metals (SEM) (also commonly referred to as shape memory alloys (SMAs)) to damp sound and vibration energy. The metallic fibers may be interspersed along with high strength fibers such as carbon fibers in laminated plies of synthetic resin. The metallic fibers undergo a reversible solid-state phase transformation from austenite to martensite when deformed or subjected to reduced temperatures. Accordingly, at colder temperatures normally encountered by commercial aircraft at cruise altitudes, the metallic fibers are more deformable and therefore provide greater inherent damping.

According to one disclosed embodiment, a damped composite structure is provided, comprising a matrix material and a plurality of SEM wire fibers held in the matrix material for damping the structure. In one form, the material matrix may optionally include a layer of resin containing an interlayer of viscoelastic material in which a group of wire fibers are embedded. In another form, the wire fibers may be interspersed with reinforcing carbon fibers infused with a synthetic resin. The wire fibers may be interspersed in tows of reinforcing fibers, or arranged unidirectionally in the form of tape or fabric along with the reinforcing fibers. The wire fibers may also be arranged as a mesh held within a synthetic resin matrix forming a material ply. The wire fibers may be formed from any of several super-elastic metal alloys, including Ni—Ti, Cu—Zn—Al, Cu—Al—Ni and Cu—Al—Be. The wire fibers may exhibit an inherent material loss factor greater than approximately 0.10.

According to another disclosed embodiment, a damped composite aircraft skin is provided, comprising: laminated plies of synthetic resin; a first set of fibers in the resin for reinforcing the plies; and, a second set of metallic fibers in the resin for damping noise and vibration, and which have an inherent material loss factor greater than 0.10. The first and second sets of fibers may be arranged in tows, or in parallel rows within each ply of the resin. Some of the plies may optionally include a viscoelastic interlayer in which the metallic fibers in the second set are embedded.

In accordance with a method embodiment, a method is provided for fabricating a damped composite structure for aircraft, comprising the steps of: introducing super-elastic metal alloy wire fibers into plies of fiber reinforced synthetic resin; and, laminating the plies. The plies may be laminated by laying up multiple fiber reinforced plies of synthetic epoxy resin having the wire fibers introduced therein, compacting the plies of the lay-up and then curing the compacted lay-up. The wire fibers may be introduced into the plies by forming tows of reinforcing fibers containing the wire fibers. Alternatively, the wire fibers may be introduced to the plies by forming a prepreg tape that includes both wire fibers and reinforcing fibers.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
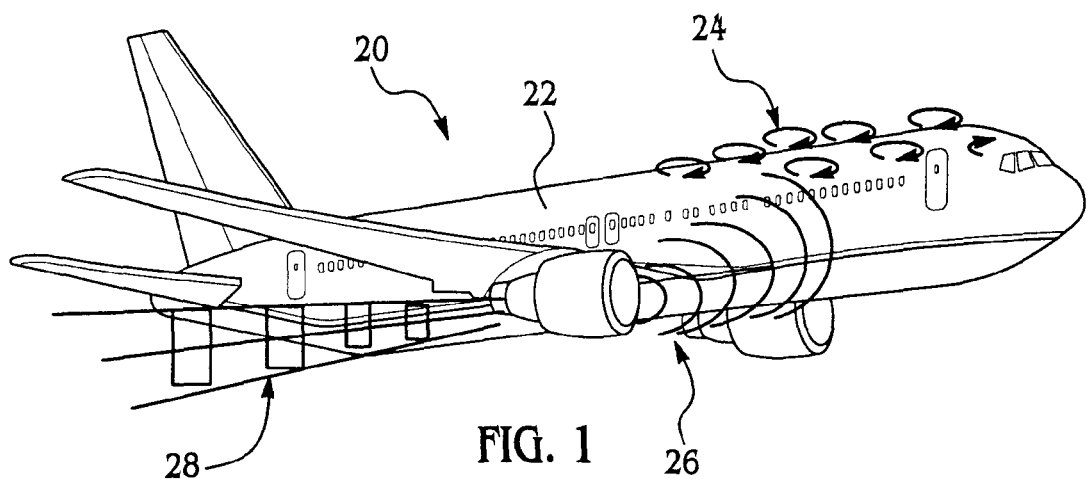
FIG. 1 is a perspective illustration of a commercial aircraft showing typical sources of noise and vibration.

Referring to FIG. 1, typical commercial and military aircraft 20 may generate noise outside the aircraft that is transmitted through stringers and other structures (not shown) to an interior cabin within the aircraft's fuselage 22. This exterior sound and vibration, collectively referred to herein as "noise", may originate from any of several sources. For example, a primary source of exterior noise may be due to air flowing over the aircraft 20 within the turbulent boundary layer on the aircraft's skin. Also, in the case of wing-mounted engine aircraft, the engines may produce a buzz saw noise indicated at 26 that is radiated directly to the fuselage 20, as well as shock cell noise 28 from the engine exhaust as a result of a pressure differential between the exhaust gasses and the ambient air. The shock cell noise 28 may excite low frequency vibration modes of the fuselage 22, resulting in noise within the cabin.

Figure 2:
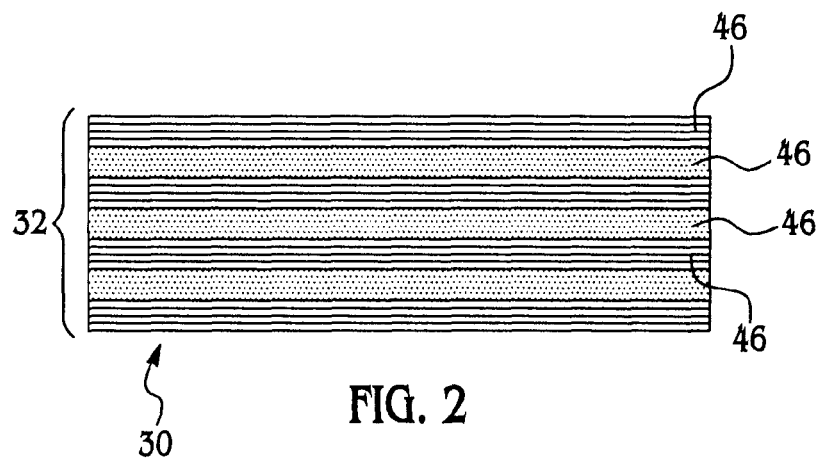
FIG. 2 is a cross sectional illustration of one embodiment of the composite structure having embedded damping.

In accordance with embodiments of the disclosure, a composite structure generally indicated at 30 in FIG. 2 possesses inherent damping that may reduce or eliminate noise within the cabin as a result of noise outside the fuselage 22. The composite structure 30 may be used in the construction of, without limitation, fuselage skins, wing skins, door panels and access panels, stiffening members, supports, struts, spars and other structural members that may act to transmit noise to the cabin interior.

In accordance with the disclosed embodiments, the composite structure 30 achieves noise damping by incorporating super-elastic wire fibers 46, sometimes referred to herein as metallic fibers formed of a shape elastic metal alloy (SEM), also referred to shape memory alloys (SMA). SEM's are metal alloys that exhibit at least two unique properties: pseudo-elasticity and the shape memory effect. These two properties are a result of a solid state phase change consisting of molecular rearrangement, which occurs in the SEM material. When mechanically or thermally stressed, the SEM material undergoes a reversible solid state phase transformation from austenite to martensite upon cooling (or by deformation), and reverses the transformation upon heating or release of the oppose stress.

Martensite is a relatively soft and easily deformed phase of SEM materials which exists at lower temperature. Austenite is the stronger phase of SEM materials, which occurs at higher temperatures. SEM materials may be particularly useful for damping in aircraft applications due to the fact that at colder temperature, it is more deformable and softer in its martensite phase, and at higher temperatures it is stronger in its austenite phase. In its martensite phase, the inherent damping of the SEM material is an order of magnitude higher than in its austenite phase.

The high damping of SEM materials results from its ability to transform mechanical energy (produced by an applied force, for example) into thermal energy in the form of heat dissipation. This energy transformation allows the SEM material to resist shock and also absorb vibration. The internal friction in the form of heat disperses the energy between the different phases, or within the same phase (martensite, austenite).

Figure 3:
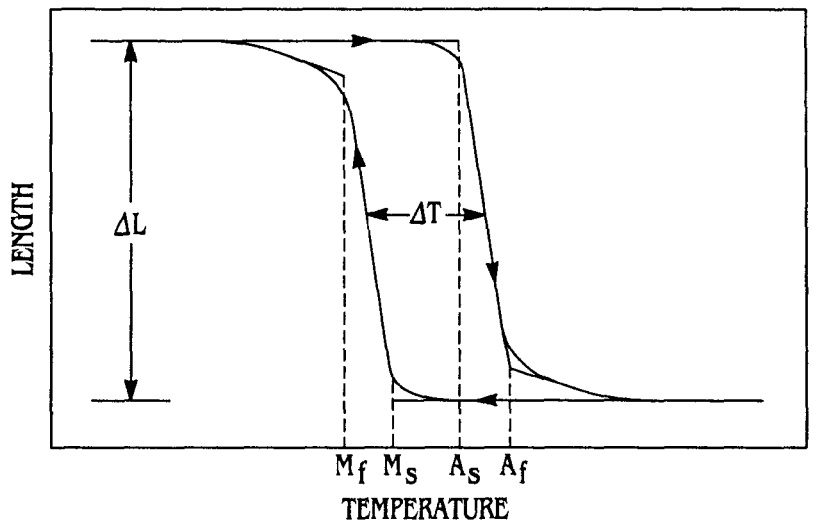
FIG. 3 illustrates a temperature hysteresis curve of a typical shape memory alloy.

Referring to FIG. 3, depending on the temperature and stress on the composite structure 30, the optimum SEM alloy for a particular application may be chosen with consideration given to the start and finish of the martensite and austenite phases. In FIG. 3, the temperatures at which these phases occur are designated as Ms (Martensite start), Mf (Martensite finish), As (Austenite start) and Af (Austenite finish). In other words, Ms denotes the temperature at which the structure begins to change from the austenite to the martensite upon cooling, while Mf is the temperature at which the transition is finished. Similarly, As and Af are the temperatures at which the reverse transformation from martensite to austenite start and finish, respectively.

Generally, the better damping will occur in the low temperature martensite phase. However, desirable damping results may be obtained by designing a hybrid fiber composite structure 30 using SEM wire fibers 46 that are in their transition phase. Higher levels of damping may be achieved, but which may diminish under constant temperature and load. In fuselage skin applications, for example, the temperature may be relatively constant although some variation may occur during cruise conditions, and loads are also constant. Where the aircraft is exposed to a low level acoustic environment, the damping can be maximized under variable conditions where temperature, static loads and acoustic loads are fluctuating.

FIG. 3 effectively illustrates the temperature hysteresis of SEM materials relative to an imposed load. The temperature hysteresis can be modified, for example, from −50 C to −5 C, up to +60 C to +120 C, by varying the ratios of the metals forming the chosen alloy.

Ni—Ti is one desirable SEM that may be suitable for use as wire fibers 46 in the hybrid composite structure 30. The temperature hysteresis and transformation properties of Ni—Ti may be changed by adding appropriate amounts of Cu, Nb, Fe or Pt. Other suitable SEM materials which are copper based, include Cu—Zn—Al, Cu—Al—Ni, and Cu—Al—Be. Further, some monocrystalline alloys may be suitable for use since they exhibit similar, super-elastic properties. Other super-elastic, highly damped alloys that may be used to fabricate the wire fibers 46 of the hybrid fiber composite structure 30 include: Fe—C—Si, Al—Zn, Fe—Cr, Fe—Cr—Al, Co—Ni—Ti, Mg, Fe, Ni, Mg—Ni, Mn—Cu, Mn—Cu-AL, Cu—Zn—Al, Cu—Al, Ni, Ni—Ti, and Fe—Co.

The composite structure 30 illustrated in FIG. 2 comprises laminated plies 32 of a fiber reinforced synthetic resin, such as a carbon fiber reinforced epoxy. The individual plies 32 may comprise a tape or fabric containing reinforcing fibers, such as carbon fibers. In the case of tape, the fibers unidirectional, whereas the fibers in the fabric may be bidirectional. The plies 32 may be oriented such that the reinforcing fibers are oriented at different angles relative to a reference direction in order to increase stiffness and rigidity of the resulting composite structure 30. As is conventional in the art, the reinforcing fibers may be bundled in tows 42 (FIG. 3) which, in the case of a fabric, may be knitted or woven to form a mat. In prepreg tape form, the tows 42 are normally arranged unidirectionally.

Figure 4:
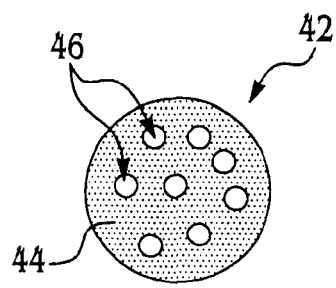
FIG. 4 is a cross sectional illustration of a typical tow of carbon fibers having interspersed wire fibers according to one embodiment.

As shown in FIG. 4, the SEM wire fibers 46 may be interspersed with the reinforcing fibers 44 within the tows 42. As will be discussed later in more detail, the diameter and number of SEM wire fibers 46 in each tow 42 will depend on the particular application, and specifically the percent volume of wire fibers 46 that are required to achieve a desired level of damping for the application, with consideration given to strength requirements. For example, the SEM wire fibers 46 may be, between 0.00005 inches and 0.005 inches in diameter. When tows 42 are employed, multiple layers are of tape are placed on a lay-up tooling (not shown). The lay-up is then infused with a suitable resin such as epoxy, following which the plies are compacted and cured so that the SEM wire fibers 46 are held in the resin matrix, along with the reinforcing fibers 44.

Figure 5:
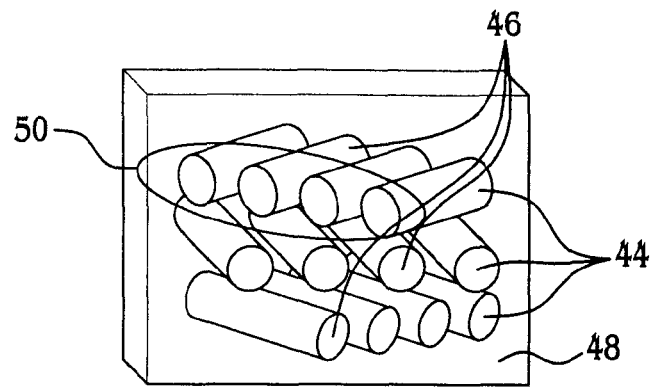
FIG. 5 is a perspective illustration of a section of a ply employing multiple layers of fiber reinforcement including interspersed wire fibers.

As shown in FIG. 5, the SEM wire fibers 46 may be interspersed along with reinforcing fibers 44 in rows 50 that are held in a resin matrix 48 as prepreg tape or fabric. Again, the size and number of the SEM wire fibers 46 will depend upon the level of damping that is desired and strength requirements.

Figure 6:
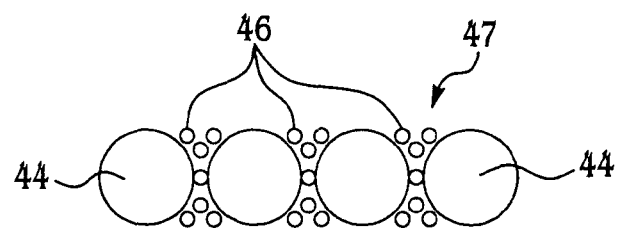
FIG. 6 is a cross sectional illustration of a layer of reinforcing fibers in which wire fibers are placed in the spaces between the reinforcing fibers.

FIG. 6 shows another embodiment in which the SEM wires may be of smaller diameter than the reinforcing fibers 44 and are placed within the spaces 47 between adjacent ones of the fiber 44. Again, the SEM wire fibers 46 are embedded in a surrounding resin matrix (not shown).

Figure 7:
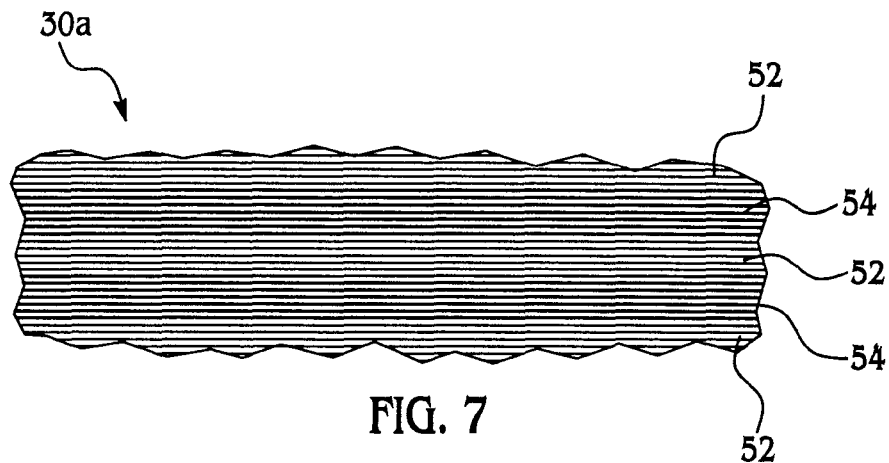
FIG. 7 is a fragmentary, cross sectional illustration of another embodiment of the composite structure in which the wire fibers are embedded in plies alternating with plies containing reinforcing fibers.
Figure 8:
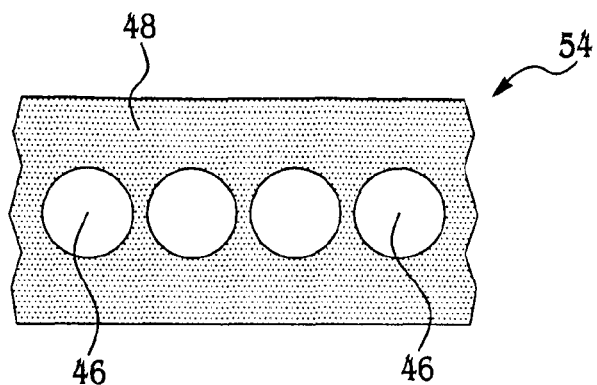
FIG. 8 is a fragmentary, cross sectional illustration of one of the plies of the composite structure illustrated in FIG. 6, showing the wire fibers held in a resin matrix.

Reference is now made to FIGS. 7 and 8 which illustrate another embodiment of the composite structure 30a having alternating groups of plies 52, 54. The ply group 52 comprises fiber reinforced resin plies, whereas the ply groups 54 each comprise one or more layers of SEM fibers 46 that are held in a resin matrix 48, as best seen in FIG. 7. Thus, rather than being integrated into plies containing reinforcement fibers 44 as illustrated in FIGS. 4 and 5, the SEM wire fibers 46 are isolated in separate ply groups 54.

The fuselage skin of modern composite aircraft is typically composed of 8 to 32 plies of carbon/epoxy pre-preg clothe and tape. Each pre-preg tape layer is arranged in a different orientation, usually 0, 90, +/−45 degrees. It is known through empirical data, that during acoustic/vibration loading, the highest stresses are in layers are the near the outer surfaces. A laminate for an aircraft skin may be composed of hybrid damped metallic fiber layers near the outer surfaces, and standard carbon/epoxy plies near the interior layer. This layup would maximize damping performance (and electrical and impact resistance) and minimize weight increase. The hybrid metallic pre-preg may typically be 20-30% greater in areal weight than standard carbon/epoxy. Macro-mechanic analysis of the disclosed hybrid laminates indicates that at least 10% to 20% of the plies may be hybrid plies in order to achieve damping levels of Loss Factor=0.03 to 0.05. This level of damping would represent a 2 to 5 times increase in the baseline damping of standard carbon epoxy laminate.

Figure 9:
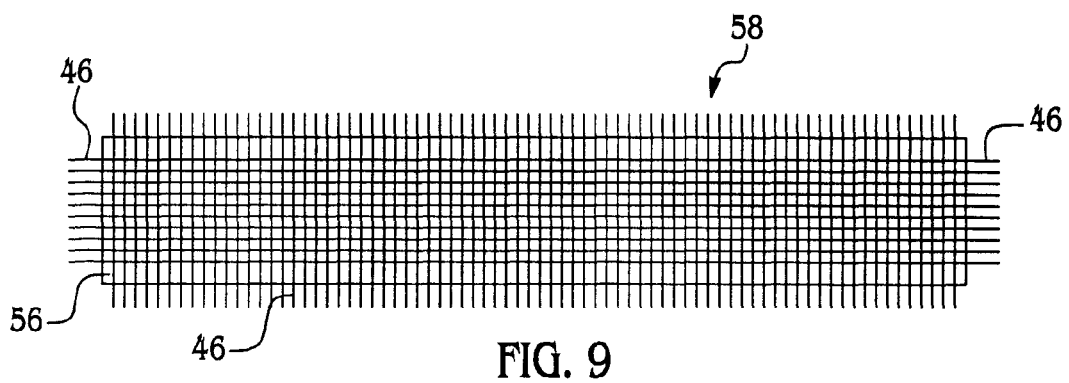
FIG. 9 is a plan illustration of an optional interlayer of viscoelastic material containing an embedded mesh of wire fibers.
Figure 10:
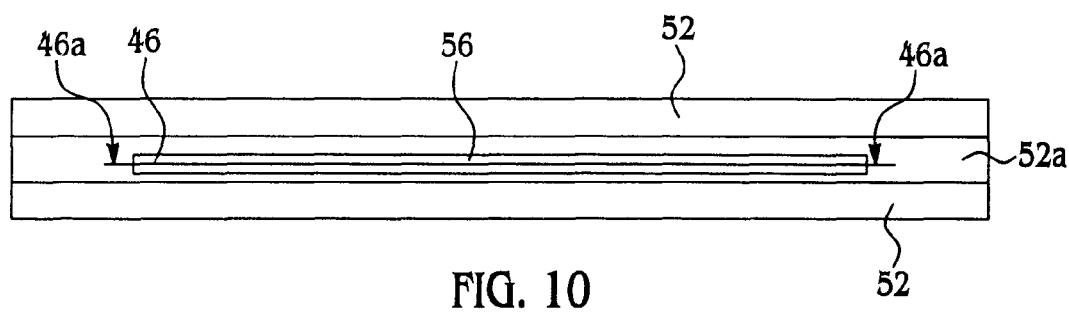
FIG. 10 is a sectional illustration showing the interlayer of FIG. 8 held within a laminated resin ply.

Reference is now made to FIGS. 9 and 10 which illustrate SEM fibers 46 embedded in an optional interlayer 56 contained within one or more single plies 52a of fiber reinforced synthetic resin. The interlayer 56 may be formed of a material that is relatively soft compared to the fiber reinforced resin in the plies 52, such as, without limitation, a viscoelastic material (VEM). VEM's encompass a variety of material classified as thermoplastics, thermoplastic elastomers or thermosets. The VEM in interlayer 56 may have a high loss tangent or ratio of loss modulus to storage modulus, in order to provide the laminate structure formed by the plies 52 with the desired damping properties. The VEM in the interlayer 56 may have a modulus that is approximately two or more orders of magnitude less than the modulus of the resin used in the plies 52.

In the illustrated example, the SEM wire fibers 46 are orthogonally arranged as a mesh 58 that is embedded in the VEM interlayer 56. The SEM wire fibers 46 may have ends 46a that extend beyond the interlayer 56 and are anchored within the resin forming ply 52a.

Figure 11:
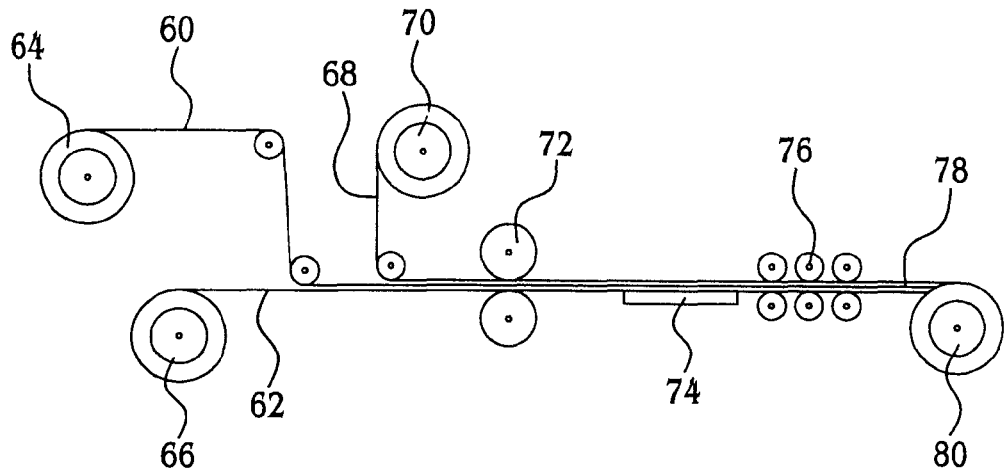
FIG. 11 is a diagrammatic illustration of a line for fabricating prepreg tape containing both reinforcing fibers and wire fibers.

Reinforced prepreg plies of material containing a hybrid mixture of reinforcing and SEM fibers may be produced using a fabrication line illustrated in FIG. 11. SEM wire fibers 60 are fed from a roll 64 and are aligned and combined into a single layer or lamina, along with carbon reinforcing fibers 62 supplied from a separate spool 66. Alignment of the fibers 60, 62 may be such that they form alternating rows of carbon and SEM metal fibers that are then combined with a flexible film of resin 68 supplied from spool 70. The single layer of hybrid fibers 60, 62 is pressed onto the resin film 68 by feed rollers 72 and are passed over a heating element 74 which heats the resin film 68 to its free-flowing temperature. Consolidation rollers 76 are used to impregnate the melted resin film 60 into the hybrid fibers 60, 62 in order to form a final, hybrid fiber prepreg tape 78 that is taken up on a spool 80.

Figure 12:
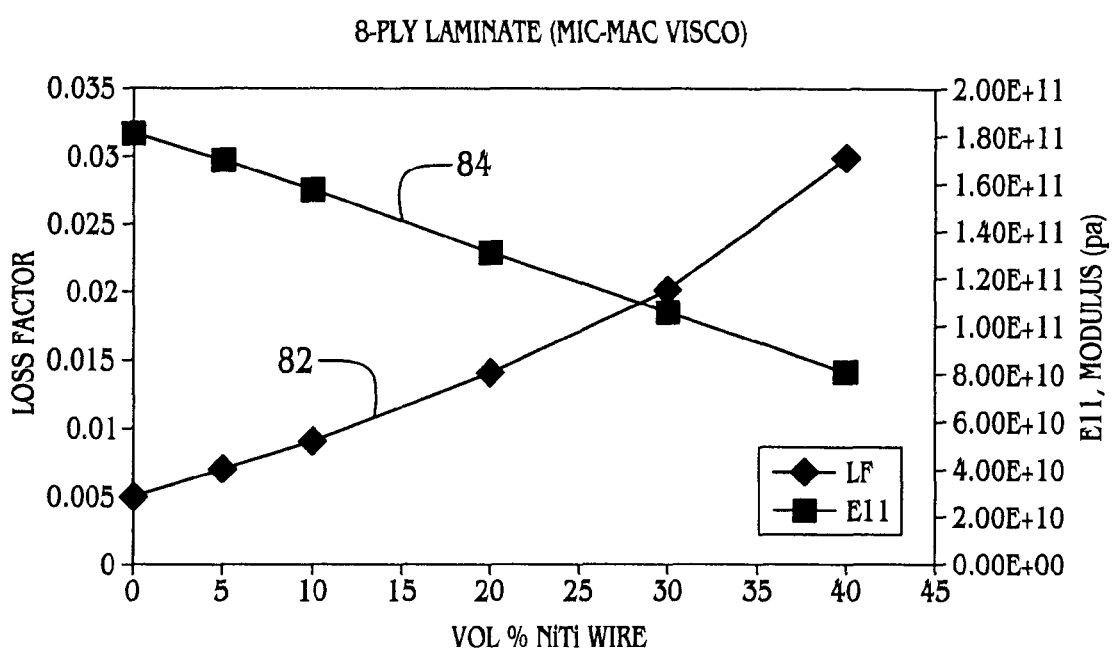
FIG. 12 is a graph relating levels of damping with their effect on stiffness as a function of the volume percentage amount SEM wire fibers used in a composite structure.

FIG. 12 is a graph illustrating the effect of SEM metal fibers 46 on laminate damping for an eight ply carbon fiber reinforced laminate structure employing Ni—Ti wire fibers. Curve 82 demonstrates the increase in the material loss factor with increasing percentage volume of Ni—Ti wire fibers in the laminate. Curve 84 demonstrates the corresponding decrease in the longitudinal modulus (E11) of the laminate. The graph of FIG. 11 demonstrates that good laminate damping for some aerospace applications such as commercial aircraft can be obtained by using 10 to 30 percent by volume of SEM fibers in the laminate structure. The results shown in FIG. 11 may be predicted using complex modulus macro-mechanic models to determine the effect of damped SEM metal fibers on laminate damping.

Loss factor Lf is a property of a material which is a measure of the amount of damping in the material. The higher the loss factor, the higher the damping. The loss factor of the material is sensitive to the load and temperature imposed on the structure. Typical reinforced composite laminates have an inherent material loss factor (Lf) from 0.001 to 0.01 depending upon temperature and stress levels. When incorporated into aircraft structures, laminate damping may be measured at Lf=0.005 to 0.015. As shown in the graph of FIG. 11, the use of a composite structure having hybrid reinforcing and SEM wire fibers may increase the inherent damping to Lf=0.03 to 0.10. Thus, a potential increase of 3 to 10 times over known composite laminates may be achieved through the use of embedded SEM wire fibers. In some applications, where the inherent laminate damping can be increased to Lf=0.03, there may not be a need for the use of "add-on" damping devices.

Increasing the level of damping in composite structures for aerospace vehicles is practical where the increased damping significantly enhances the total system damping. The use of SEM wire fibers 46 to increase damping may be evaluated in relation to the amount of damping initially present in the structure, and the affect on the structure in terms of the weight, strength and stiffness of the resulting composite material. While the ultimate strength and stiffness of a composite structure may be slightly reduced as a result of the use of SEM metallic fibers 46 to increase damping, the SEM wire fibers 46 may cause the laminate to become tougher, in terms of fatigue and impact resistance. This may be particularly important in aircraft where some structural parts are designed to achieve higher levels of stiffness or impact resistance, or fracture toughness.

It should be noted here that plies containing a hybrid mixture of fibers e.g. carbon and SEM wire fibers may be selectively used throughout the composite structure to achieve the desired level of damping, with a net reduction in weight compared to an all carbon fiber structure with add-on damping. Thus, for example, in order to achieve 25-33% of SEM wire fibers by volume, every two plies out of eight plies or four plies out of twelve plies may contain the SEM fibers in order to achieve a desired level of damping. Also, plies containing the hybrid fiber mixture may be selectively used throughout a composite structure. For example, a composite laminate having hybrid fiber plies may be used only in the frames within a skin or in the caps of a hat, or in the shear-tie of a frame. In the case of a wing skin, the hybrid fiber plies may only be used in the inboard section of an upper wing skin, and only in the main spars.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A damped composite structure, comprising:
   a matrix material;
   a plurality of metallic shape memory alloy wire fibers held in the material matrix for damping the structure; and,
   a plurality of reinforcement fibers in said material matrix.

2. The damped composite structure of claim 1, wherein the material matrix includes a layer of viscoelastic material and the wire fibers are embedded in the viscoelastic material.

3. The damped composite structure of claim 2, wherein the material matrix includes a layer of resin and the layer of viscoelastic material is contained in the layer of resin.

4. The damped composite structure of claim 3, wherein the wire fibers extend from the layer of viscoelastic material into the layer of resin.

5. The damped composite structure of claim 1, wherein the wire fibers are arranged as a mesh.

6. The damped composite structure of claim 1, further comprising:
   carbon fibers for reinforcing the material matrix, and
   wherein the material matrix includes a layer of synthetic resin.

7. The damped composite structure of claim 6, wherein:
   the carbon fibers are arranged in a plurality of tows, and
   the wire fibers are contained within the tows.

8. The damped composite structure of claim 1, wherein the shape memory alloy is selected from the group consisting of: Ni—Ti, Cu—Zn—Al, Cu—Al—Ni, Cu—Al—Be.

9. The damped composite structure of claim 8, wherein the shape memory alloy includes one of: Nb, Fe and Pt.

10. The damped composite structure of claim 1, wherein the shape memory alloy is selected from the group consisting of: Fe—C—Si, Al—Zn, Fe—Cr, Fe—Cr—Al, Co—Ni—Ti, Mg, f Fe, Ni, Mg—Ni, Mn—Cu, Mn—Cu—AL, CU—Zn—Al, CU—Al, Ni, Ni—Ti, and Fe—Co.

11. The damped composite structure of claim 1, wherein the wire fibers exhibit an inherent material loss factor greater than approximately 0.10.

12. A damped composite aircraft structural component, comprising:
   laminated plies of synthetic resin;
   a first set of fibers in the resin for reinforcing the plies; and,
   a second set of fibers in the resin for damping noise and vibration, the fibers in the second set being metallic shape memory alloy wires and having an inherent material loss factor greater than approximately 0.10.

13. The damped composite aircraft structural component of claim 12, wherein the first and second sets of fibers are alternately arranged in layers within the plies.

14. The damped composite aircraft structural component of claim 12, wherein:
   the first set of fibers are arranged in tows, and
   the second set of fibers are interspersed within the tows.

15. The damped composite aircraft structural component of claim 12, wherein:
   the first set of fibers are arranged in parallel rows in each of the plies, and
   the second set of fibers are disposed between the rows of the fibers in the first set.

16. The damped composite aircraft structural component of claim 12, wherein the second set of fibers is arranged between the first set of fibers.

17. The damped composite aircraft structural component of claim 12, wherein:
   certain of the plies include a layer of viscoelastic material, and
   the second set of fibers are held in the layer of viscoelastic material.

18. The damped composite aircraft structural component of claim 17, wherein:
   the fibers in the second set thereof have ends, and
   the ends of the fibers in the second set are anchored in the resin.

19. The damped composite aircraft structural component of claim 12, wherein the fibers in the first set of fibers are carbon fibers.

20. The damped composite aircraft structural component of claim 12, wherein the fibers in the second set thereof are formed from a metal alloy selected from the group consisting of: Ni—Ti, Cu—Zn—Al, Cu—Al—Ni, Cu—Al—Be.

* * * * *